United States Patent [19]

Fish

[11] 3,760,565
[45] Sept. 25, 1973

[54] ANTI-POLLUTION METHOD
[75] Inventor: William M. Fish, Des Peres, Mo.
[73] Assignee: Aluminum Company of America, Pittsburgh, Pa.
[22] Filed: July 19, 1971
[21] Appl. No.: 163,715

[52] U.S. Cl. .......................... 55/71, 55/79, 204/67, 423/240, 423/241, 423/495
[51] Int. Cl. ...... B01d 53/06, C22d 3/12, C01b 7/00
[58] Field of Search .................... 23/25, 88; 204/67, 204/247; 423/240, 241; 55/71, 79

[56] References Cited
UNITED STATES PATENTS

| | | | |
|---|---|---|---|
| 3,503,184 | 3/1970 | Knapp et al. | 23/88 X |
| R27,383 | 5/1972 | Johnson | 204/67 |
| 3,664,935 | 5/1972 | Johnson | 204/67 |
| 3,473,887 | 10/1969 | Chu et al. | 23/88 |

Primary Examiner—John H. Mack
Assistant Examiner—D. R. Valentine
Attorney—Abram W. Hatcher

[57] ABSTRACT

Removal of fluoride from a stream of gas contaminated therewith by sorption on alumina moving in the same direction and in contact therewith for not exceeding 20 seconds.

7 Claims, 1 Drawing Figure

PATENTED SEP 25 1973 3,760,565
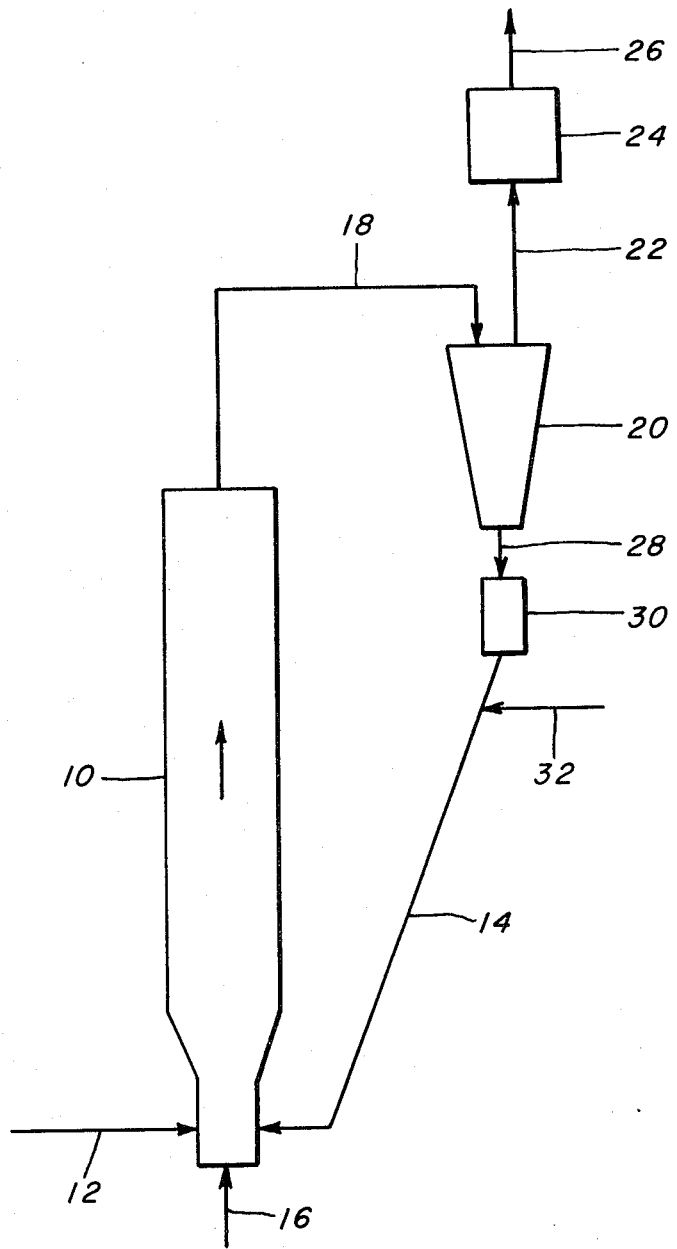
INVENTOR.
WILLIAM M. FISH
BY *Abram W. Hatcher*
Attorney

ANTI-POLLUTION METHOD

BACKGROUND OF THE INVENTION

1. Field of the Invention

This invention relates to environmental control. More particularly, it relates to minimizing escape to the atmosphere of fluoride, particularly hydrogen fluoride, from gas containing same, for example, off gas or effluent from electrolytic cells used in the production of aluminum by electrolysis of alumina.

2. Description of the Prior Art

It is known that fluoride, for example, in the form of hydrogen fluoride (HF), may be removed to a considerable extent from gas containing same by adsorption on or chemisorption on particulate alumina, for example, alumina in a static or fluidized bed. When I refer to fluoride herein, I refer to it broadly as encompassing fluorine gas and fluorides, for example, HF, that is, fluorine or fluoride (F) in separate form and in combined form, for example, in any compound containing fluorine or in ionic form. While static and fluidized beds of alumina have proved highly successful in minimizing pollution of the atmosphere by fluoride, there are, nevertheless, problems associated with the use of such. The equipment employed in such static and fluidized bed arrangements, including perforated plates or like supports, is complicated and expensive to use and maintain. Furthermore, a longer alumina residence time in the bed is generally employed than required for maximum alumina sorption efficiency. Therefore, devising an improved and less costly system or method for sorbing fluoride on alumina and one which has a more economical use of alumina and a shorter time of contact between a particle of alumina and the stream of fluoride-contaminated gas represents a highly desirable result.

SUMMARY OF THE INVENTION

After extended investigation, I have found that particles of alumina can be successfully used for removal of fluoride, particularly hydrogen fluoride, from gas containing same, especially effluent from electrolytic reduction cells, by contacting the alumina with a stream of the gas moving or flowing concurrently therewith for no longer than a total contact time of about 60 seconds, preferably less than about 20 seconds. Maximum chemisorption of the fluoride on the particles of alumina, which is believed to be in a sustantially monomolecular layer on the surface of the particles, is sometimes accomplished in as little as 2 seconds or less of total contact time between a particle of alumina and the concurrently moving stream of gas. I prefer that the stream of gas and particulate alumina be flowing upwardly in a confined zone. By upwardly I means closer to a vertical than a horizontal direction, that is, at an upward angle of at least about 45°. My process is characterized by the fact that during this concurrently moving total contact time of not exceeding about 60 seconds, the alumina particles are intimately contacted with highly dilute gas in the dispersed phase.

By highly dilute, I mean that the fluoride-contaminated gas undergoing treatment according to the invention generally contains less than 50 gF/m³ gas and in many instances as little as about 4 gF/m³ gas. From my experience with alumina smelting pots I have found that the off gas treatable according to the invention sometimes contains as small an amount as about 0.1 gF/m³ when it comes from prebaked pots and as small an amount as 1 gF/m³ when it comes from Soderberg-type pots. By my process I am able to achieve at least 90 percent removal of fluoride from a gas stream, often as high as 99 percent.

The preferred amount of alumina useful according to my invention is from 4 to 400 grams of alumina per cubic meter (g/m³) of gas being treated, preferably 40–200 g/m³. Also, according to my invention, the preferred surface area of the alumina used is at least about 20 m²/g, preferably 20–200 m²/g.

The alumina used as a sorbent according to my invention may conveniently be of metal grade or smelting grade, that is, of a grade generally considered in the trade as suitable for production of elemental aluminum therefrom by electrolysis. After use as a sorbent according to my invention it may conveniently be conducted to smelting pots for electrolysis therein. The alumina may be sprayed into the stream of gas either shortly before it enters a vertical tower or column or directly into a tower or column of upwardly moving gas close to its entrance at the bottom of such a tower or column.

While I do not wish to be bound by any particular theory as to why the amount of fluoride sorbed by the alumina is so high or why my process is so highly efficient in removing fluoride, it may be that mixing caused by turbulence created when the velocity of the gas is reduced as it enters the preferred confined zone may be at least partly responsible.

The alumina containing sorbed fluoride may be conveniently separated from the gas stream by one or more conventional-type cyclones, or the like, the construction and techniques for the use of which are well known. After separation from the gas stream, the alumina may be recycled or further used in removing fluoride from the gas stream, if desired, and, as explained hereinabove, also for feed to the electrolytic cell or cells from which the gas stream may emanate.

The temperature in the sorption zone generally ranges from around 90°–175°C.

One of the important discoveries of my invention is that, in removing fluoride by use of concurrently moving gas and particles of adsorbent alumina, intimacy of contact appears to be a controlling factor. According to my process there appears to be an improved intimacy of contact between the fluoride and the particles of alumina, thus improving the efficiency of sorption of fluoride by the alumina.

A particular advantage of my invention is that, if desired, all of the alumina used in removal of fluoride from off-gas from one or more cells for electrolytic production of aluminum from alumina may be used as alumina to be electrolyzed in the one or more cells, resulting in a highly economical use of alumina. A further benefit achieved by such an operation is that when the volume of effluent from the one or more cells is high, particularly when compared to the fluoride content thereof, and additional alumina is thus needed to keep the density in the vertical zone high enough, that is, to provide the preferred at least 4 g/m³ Al₂O₃, the additional alumina required may be supplied by recycling to the contacting zone some of the alumina which accumulates after its first use as sorbent.

An additional advantage of the process of my invention is that contaminants other than fluoride may be removed from a stream of polluted gas by the alumina.

BRIEF DESCRIPTION OF THE DRAWING

A further understanding of the invention will be gained from the drawing which forms a part hereof.

In the drawing, gas containing fluoride, for example, from one or more electrolytic cells for production of aluminum from alumina (not shown), enters tower 10 via line 12. Alumina is fed to the tower via line 14. A motorized fan may be located at 16 for aiding in driving vertically upward the gas containing the fluoride and the alumina particles through tower or column 10. Additional gas may be introduced at 16 as desired or needed to assist in the flow of the gas to be purified and the adsorbent alumina particles vertically through tower 10. Gas containing alumina particles with fluoride sorbed thereon is conducted from tower 10 via line 18 to cyclone or like separator 20 wherein the alumina containing sorbed fluoride is separated from the gas, which exits in purified form via line 22 to bag filter or other device 24, which may be used, if desired, to remove any further fine particulate matter which may still be contained therein. The gas may then be emitted to the atmosphere via line 26 in substantially pure, non-polluting form. Alumina collected at cyclone or like separating device 20 may be conducted via line 28 to a storage container or the like 30, from which a portion thereof may be introduced or recycled as needed to tower 10 via line 14 and/or all or a portion thereof conducted to one or more reduction cells (not shown). Additional alumina may be introduced via line 32. Screw feeders may be employed both for conducting alumina to the tower and for reintroducing alumina recycled thereto from the cyclone or like separating device 20.

DESCRIPTION OF THE PREFERRED EMBODIMENTS

EXAMPLE I

A 4-m. diameter tower suspension system was installed to handle fumes from 24 prebaked anode-type pots. By use of this suspension system fluoride was removed from the pot effluent gas at from 53 to 99 percent efficiency, that is, such that from 53 to 99 percent of the total amount of fluoride in the effluent stream was removed therefrom. A similar 1-m. diameter, 6-m. high suspension system removed 99.9 percent fluoride from the effluent gas from about 30 prebaked anode-type pots, the gas traveling at a rate of about 130 m³ per minute at about 95°C. The velocity in the vertical, approximately 1-m. diameter tower was 1.5 m./sec. for the gas moving together with the alumina from the bottom toward the top thereof, the height of the tower being about 6-m. A cyclone was used for collection of the alumina after sorption of the fluoride thereon. The amount of the alumina introduced near the bottom of the tower was varied from about 15 to about 25 kg/hr. The maximum loading for this particular tower was calculated as 4 g/m³ $Al_2O_3$.

EXAMPLE II

A tower approximately 1-m. in diameter and 6-m. high is used to remove fluoride from a potline of 31 Soderberg-type pots, the gas temperature being about 120°C. Effluent gas from the 31 pots is fed at about 900 m/min. to the vertical tower or contactor. The speed of the gas after entrance into the tower is reduced from about 9 m/sec. to about 3 m/sec. The contact time for the alumina and the gas in the tower is about 2 seconds. The alumina-to-gas ratio is varied from 45–450 g/m³ of effluent gas from the 31 pots. At 90 g/m³ this system operates at approximately 99 percent efficiency, that is, with about 99 percent or more of the fluoride being removed from the effluent stream. The alumina containing the fluoride sorbed thereon is removed by using a cyclone collector.

While the invention has been described in terms of preferred embodiments, the claims appended hereto are intended to encompass all embodiments which fall within the spirit of the invention.

Having thus described my invention and certain embodiments thereof, I claim:

1. A process for prevention of pollution of the atmosphere by fluoride contained in gas released thereto which comprises contacting particulate alumina with a stream of fluoride-containing gas introduced at the lower portion of a tower containing said alumina so as to flow concurrently therewith for a total contact time between a particle of alumina and said stream of fluoride-containing gas of from at least about 2 to not exceeding 60 seconds to an exit point for said alumina and said gas in the upper portion of said tower, thereby sorbing said fluoride on said alumina, the said gas stream having a fluorine content of from 0.1 to 50 grams per cubic meter, and the alumina amounting to about 4–450 grams per cubic meter of the gas stream.

2. The process of claim 1 wherein said contact time averages from about 2 to about 20 seconds.

3. The process of claim 1 wherein the particulate alumina has a surface area of from about 20 to about 200 m²/g.

4. The process of claim 1 wherein the concurrently flowing particulate alumina and stream of gas are moving in an upward direction.

5. The process of claim 1 wherein at least part of the alumina is separated and is recycled for further contacting with additional fluoride-containing gas.

6. A process for removing contaminating fluoride from gas containing same which comprises introducing particulate alumina and gas containing fluoride in the lower portion of a tower, flowing said alumina and said gas together from said lower portion to the upper portion of said tower for a contact time from at least about 2 to not exceeding about 60 seconds, conducting said gas and said alumina from said top portion to a separating zone in which said alumina with fluoride sorbed thereon is separated from said gas and conducting said alumina with fluoride sorbed thereon and gas substantially free of fluoride separately from said separating zone.

7. The process of claim 6 wherein the separating zone comprises a cyclone-type separator.

\* \* \* \* \*